United States Patent [19]

Kish

[11] Patent Number: 5,799,931
[45] Date of Patent: Sep. 1, 1998

[54] COIL SPRING FOR OVERRUNNING SPRING CLUTCHES

[75] Inventor: Jules G. Kish, Milford, Conn.

[73] Assignee: Sikorsky Aircraft Corporation, Stratford, Conn.

[21] Appl. No.: 730,519

[22] Filed: Oct. 11, 1996

[51] Int. Cl.⁶ .................................................. F16F 1/10
[52] U.S. Cl. .................................. 267/155; 192/415
[58] Field of Search ............................... 267/155, 166, 267/169, 174, 180, 157; 29/173; 192/415

[56] References Cited

U.S. PATENT DOCUMENTS

| | | | |
|---|---|---|---|
| 4,570,318 | 2/1986 | Kish | 29/173 |
| 4,690,390 | 9/1987 | Kish | 267/155 |
| 4,869,471 | 9/1989 | Schwarz et al. | 267/180 X |
| 4,926,991 | 5/1990 | Stone et al. | 192/41 S |
| 4,934,499 | 6/1990 | Kish | 192/41 S |
| 4,938,333 | 7/1990 | Kish | 192/41 S |
| 5,360,211 | 11/1994 | Smith et al. | 267/180 |

*Primary Examiner*—Lee W. Young
*Attorney, Agent, or Firm*—Brian A. Collins

[57] ABSTRACT

A coil spring (10) for an overrunning spring clutch assembly wherein the coil spring (10) includes a crossover coil (20) having a longitudinal crossover gap (24) formed therein, and a dynamic balance weight (40) secured in combination with one of the internally opposed surfaces (24s) of the longitudinal crossover gap (24). The dynamic balance weight (40) is configured such that, when assembled in combination with a central arbor (32) and coaxial clutch members (34) of the overrunning spring clutch assembly, the dynamic balance weight (40) is spaced apart from the central arbor (32) and each of the clutch members (34). Furthermore, the dynamic balance weight (40) is fabricated from a material having a density $\rho_{BW}$ which is greater than the density $\rho_{CC}$ of the base material from which the crossover coil (20) is fabricated.

20 Claims, 2 Drawing Sheets

COIL SPRING FOR OVERRUNNING SPRING CLUTCHES

TECHNICAL FIELD

This invention is directed to coil springs for use in overrunning spring clutch assemblies, and, more particularly, to an improved coil spring which augments the bending stiffness of the overrunning spring clutch assembly, is dynamically balanced, and facilitates fabrication via low cost manufacturing techniques.

BACKGROUND OF THE INVENTION

Overrunning spring clutches suitable for high torque applications, such as for transmission of torque from a helicopter gas turbine engine, have undergone extensive research and development during the past decade. The impetus therefor has been based upon the anticipated gains in operational reliability, i.e., the relatively low number of component parts, and the relative ease of assembly/disassembly of the spring clutch configuration, i.e., as compared to conventional ramp roller, sprag, or centrifugal clutch assemblies.

An overrunning spring clutch operates on the principle that a coil spring expands or contracts radially in response to differential rotation of its opposite ends. In an expanded state, the coil spring may be caused to frictionally engage input and output clutch members to drive torque thereacross, and, in a contracted state, the coil spring may be caused to disengage the clutch members and permit an overrunning condition therebetween. With regard to the latter, an overrunning condition is an operational mode wherein the rotational speed of the output member exceeds that of the input member such as when the drive source is downthrottled or, in a helicopter application, when the main rotor is in an autorotative state.

This principle is best understood by referring to a representative spring clutch assembly, as illustrated in FIG. 1. The spring clutch assembly 100 comprises an input clutch member 102, an output clutch member 104, a central arbor 106 and a coil spring 108. As shown, the input and output clutch members 102, 104 are coaxially aligned and separated by a small clearance gap 110. Furthermore, the input clutch member 102 is driven by a drive source 112, e.g., a helicopter gas turbine engine, and the output clutch member 104 includes an integrally formed pinion 114 as a means for providing drive output.

The coil spring 108 is disposed internally of and coaxially aligned with the input and output clutch members 102, 104 such that approximately one half of the coil spring 108 is disposed within each of the clutch members 102, 104, thereby bridging the gap 110 therebetween. Furthermore, the coil spring 108 is centered and supported by the central arbor 106 which is coupled to and rotates with the input clutch member 102. The proximal ends of the coil spring 108 include "teaser coils" 116 which are disposed in friction contact with cylindrical inner surfaces 102s and 104s of the input and output clutch members 102 and 104, respectively. The import of the teaser coils 116 is described in subsequent paragraphs.

In operation, torque drive is achieved when the rotational speed of the input clutch member 102 exceeds the rotational speed of the output clutch member 104. In this operating mode, the teaser coils 116 frictionally engage the cylindrical inner surface 104s of the output housing 104, thereby causing the entire coil spring 108 to unwind and expand outwardly against the cylindrical inner surfaces 102s, 104s of the input and output clutch members 102, 104. Continued expansion of the coil spring 108 generates sufficient frictional force to drive high levels of torque from the input to the output clutch members 102, 104.

Overrunning is achieved when the output clutch member 104 "runs ahead" of the rotating coil spring 108. In this operating mode, the output clutch member 104 causes the teaser coils 116 to overwind the coil spring 108, thereby contracting the coil spring 108 and permitting the output clutch member 104 to rotate freely (albeit subject to a small frictional drag force associated with the teaser coils 116). In the overrunning mode, the coil spring 108 is seated upon and centered by the central arbor 106 which maintains the critical dimensional relationship between the teaser coils 116 and the cylindrical inner surfaces 102s, 104s of the clutch members 102, 104. That is, for proper operation, the teaser coils 116 must effect a critical steady friction force on the clutch members 102, 104 during transition, e.g., from an overrunning mode to a torque drive mode.

Insofar as the coil spring operates, in dual fashion, to effect actuation of the spring clutch assembly, and to fully transfer torque loads, it will be appreciated that such requirements impose substantial structural complexity upon the coil spring. Various modifications and improvements have been made to the design and/or manufacture of the coil spring to, inter alia, alleviate stresses and stress concentrations, reduce bending moment loads, improve dynamic balance characteristics, and facilitate fabrication via low cost manufacturing methods.

One area of emphasis relates to the crossover coil of the coil spring, which crossover coil is disposed intermediate the teaser coils and "crosses" the location corresponding to the gap between the input and output clutch members. U.S. Pat. Nos. 4,570,318, 4,690,390 and 4,938,333 describe various manufacturing methods for fabricating such a crossover coil so as to eliminate imbalances and/or prevent cocking or misalignment of the coil spring.

To appreciate the issues being addressed in the prior art, it is necessary to understand the manufacturing approach adopted for the fabrication of the coil spring. The coil spring is fabricated from tube stock of high strength steel wherein the tube is rotated as an end mill is fed axially along the tube. This process, which forms the various coils of the spring, is similar in technique to machining pipe threads. The "lead" of the end mill determines the pitch of the coils which is varied to form an exponential increase in coil width from one end, corresponding to the teaser coils, to the longitudinal center, corresponding to the crossover coil. Such coil width variation effects a nearly uniform stress distribution in the coil spring during operation. The milled tube stock is then compressed and heat treated so that the coils remain contiguous.

One exception to the requirement for effecting substantially exponentially increasing coil width relates to the crossover coil wherein it is desirable to effect an abruptly wider coil for augmenting the bending stiffness of the assembled spring clutch assembly. That is, since the crossover coil bridges the gap between the input and output clutch members, it is desirable that a single coil cross the gap and provide rigidity between the clutch members when torque is driven. As such, the milling operation is specially adapted to effect a wide crossover coil.

One prior art method for milling the crossover coil relates to forming an abrupt axial cut to widen the crossover coil. That is, the end mill is axially fed through the rotating tube and, upon reaching the desired crossover point, rotation of the tube is interrupted so that an axial cut rather than a pitch cut is made. A disadvantage to this approach relates to an imbalance created by the axial cut in the finally formed, i.e., compressed, state. It will be appreciated that axial compression of the tube will not close the crossover gap formed by the axial cut. For a spring clutch assembly operating at 30,000 RPM, the crossover gap produces an imbalance in excess of 170 lbs (757N), which imbalance is unacceptable in the context of a overrunning clutch for a helicopter rotor drive train.

Another method for manufacturing the crossover coil (described in the '318 and '390 patents) is characterized by varying the relative feed rate to form an off-axis sinusoidal cut which gradually increases the width of the crossover coil. In the compressed state, the crossover gap is negligible, thereby minimizing dynamic imbalance. While mitigating the problems associated with imbalance, this approach reduces the bending stiffness of the spring clutch assembly insofar as the off-axis cut reduces the effective bending support provided by the crossover coil.

This may be better appreciated by visualizing/comparing the effective bending support area produced by an axial cut and that produced by an off-axis cut. For the purposes of discussion, effective bending support area is defined as the bearing area wherein the longitudinal engagement of the crossover coil within a clutch member is sufficient to react bending loads about the longitudinal axis of the spring clutch assembly without cocking or misalignment. For a crossover coil having an axial cut, it will be appreciated that the axial cut permits all portions of the crossover coil to provide bearing support between the clutch members. That is, full longitudinal engagement of the crossover coil may be achieved at the radial location of the axial cut and, consequently, about most or all of the circumference of the crossover coil. In contrast, for a crossover coil having an off-axis cut, the areas thereof which initially engage the clutch members, on an angle, do not provide bearing support insofar as sufficient longitudinal engagement is not immediately achieved. It is only after the off-axis cut produces sufficient longitudinal engagement within the clutch members that the crossover coil can effectively provide bearing support. Consequently, the off-axis cut produces an arc length of unsupported area which reduces the bending stiffness of the spring clutch assembly.

Yet another method for manufacturing the crossover coil (described in the '333 patent) comprises a dual step milling approach wherein an end mill is employed to make all necessary pitch cuts and an electro-discharge machining (EDM) device is used to make an axial cut. An EDM device utilizes a charged wire which is held taut to make fine (wire-thin) cuts while minimizing the removal of material from the subject article to be machined. The axial cut produced by the EDM device completes the milling operation without creating dynamic imbalances and without reducing the bending stiffness of the coil spring. Shortcomings associated with this approach, however, relate to the degradation of material properties, e.g., fatigue strength, produced by the EDM process, the time and expense associated with dual set-up of the tube stock for machining, and the cost of specially adapted EDM equipment. With regard to the latter, the tube stock is not amenable to conventional EDM equipment insofar as access to one side of the charged wire must be achieved internally of the tube. Accordingly, the EDM device must be adapted to include at least one elongate arm for being disposed within the tube and for being attached to and guiding the charged wire.

A need, therefore, exists for a coil spring which augments the bending stiffness of the spring clutch assembly, is dynamically balanced, and facilitates fabrication via low cost manufacturing techniques.

SUMMARY OF THE INVENTION

It is an object of the present invention to provide a coil spring for an overrunning spring clutch assembly which provides enhanced bearing support within and between the clutch members thereof for augmenting the bending stiffness of the spring clutch assembly.

It is another object of the present invention to provide such coil spring which compensates for material removed during its manufacture for achieving dynamic balance.

It is yet another object of the present invention to provide such a coil spring which facilitates manufacture via conventional numerically controlled milling equipment for reducing set-up time and costs associated therewith.

These and other objects are achieved by a coil spring for an overrunning spring clutch assembly wherein the coil spring includes a crossover coil having a longitudinal crossover gap formed therein, and a dynamic balance weight secured in combination with one of the internally opposed surfaces of the longitudinal crossover gap. The dynamic balance weight is configured such that, when assembled in combination with a central arbor and coaxial clutch members of the overrunning spring clutch assembly, the dynamic balance weight is spaced apart from the central arbor and each of the clutch members. Furthermore, the dynamic balance weight is fabricated from a material having a density which is greater than the density of the base material from which the crossover coil is fabricated.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

Figure 1:
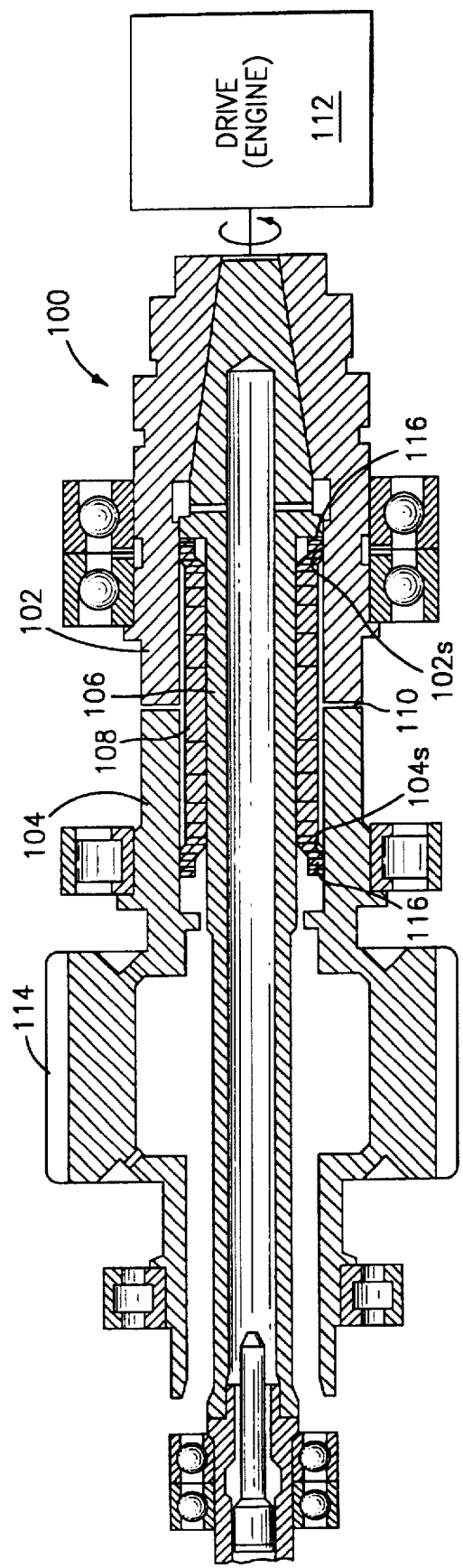
FIG. 1 is a partially sectioned and broken away view of an overrunning spring clutch assembly for revealing the internal details and arrangement thereof, including a coil spring for driving torque across and facilitating overrunning between input and output clutch members.
Figure 2:
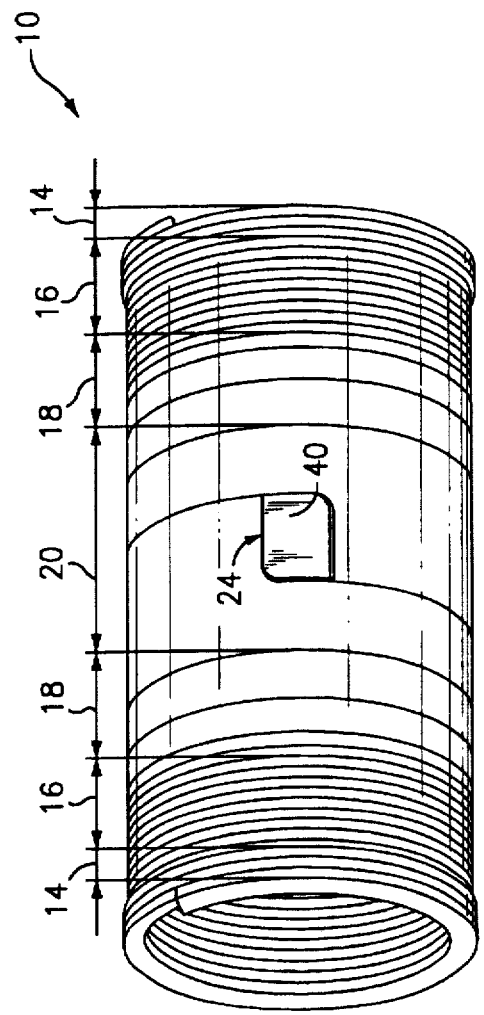
FIG. 2 is an isolated perspective view of a coil spring according to the present invention including a dynamic balance weight secured in combination with a crossover coil of the coil spring.

Referring now to the drawings wherein like reference characters identify corresponding or similar elements throughout the several views, FIG. 2 depicts an isolated perspective view of a coil spring 10 according to the present invention for use in an overrunning spring clutch assembly (not shown). The coil spring 10 comprises teaser coils 14 disposed at opposite ends of the coil spring 10, transition coils 16 adjoining the teaser coils 14, constant stress coils 18 adjoining the transition coils 16, and a central crossover coil 20 disposed between and adjoining the constant stress coils 18.

Functionally, the teaser coils 14 frictionally engage coaxially aligned input and output clutch members (not shown) of an overrunning spring clutch assembly to effect engagement or disengagement of the coil spring 10, thereby driving torque across or permitting an overrunning between the clutch members. The transition coils 16 are characterized by increased radial thickness such that torque levels may be gradually increased from the teaser coils 14 to the constant stress coils 18. The constant stress coils 18 are characterized by exponentially varying width for evenly distributing axial stresses (i.e., compressive) and serve to transmit the preponderance of the torque loads through the coil spring 10. The crossover coil 20 is characterized by an abrupt increase in coil width for bridging a clearance gap between the input and output clutch members and for providing sufficient longitudinal engagement within each clutch member to augment the bending stiffness of the assembled spring clutch assembly.

While the manufacturing process will be discussed in greater detail hereinafter, the milling operation for increasing the width of the crossover coil 20 produces a longitudinal crossover gap 24. As discussed in the Background of the Invention, various efforts have been made to reduce or eliminate such crossover gaps for the purpose of mitigating coil spring imbalance. These efforts have yielded a modicum of improvement, but suffer from secondary effects such as chaffing, reduced fatigue strength, or increased manufacturing costs.

Figure 4:
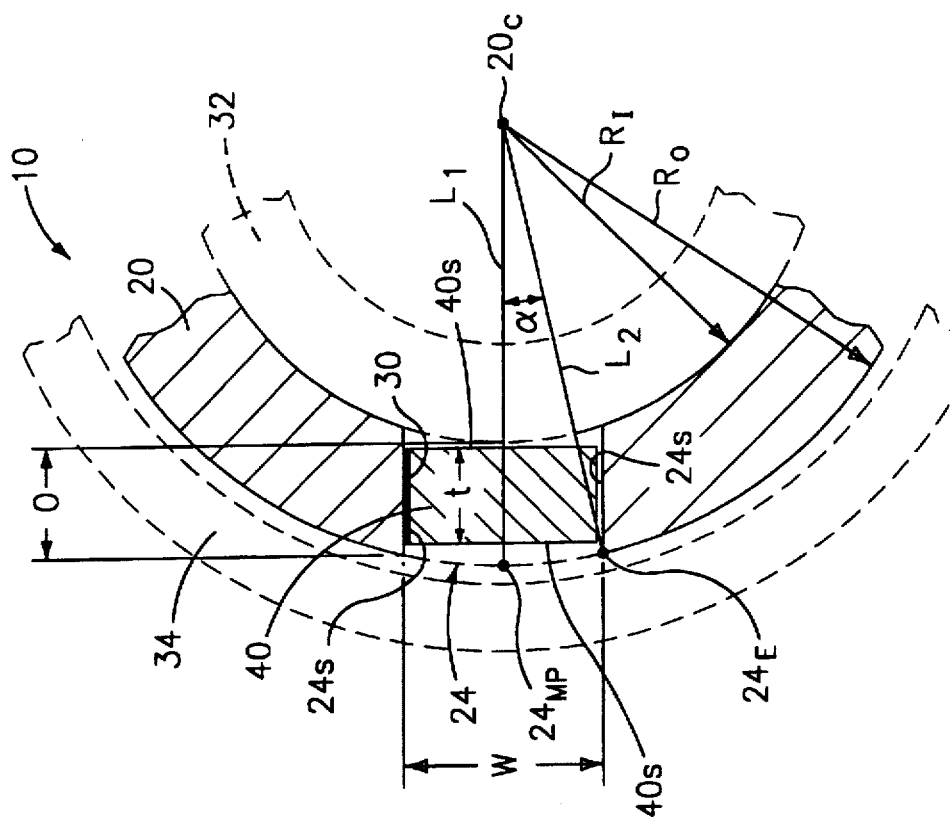
FIG. 4 is a partial cross-sectional view taken along line 4—4 of FIG. 3 for depicting various critical dimensions of the balance weight as compared to the crossover coil and the longitudinal crossover gap.
Figure 3:
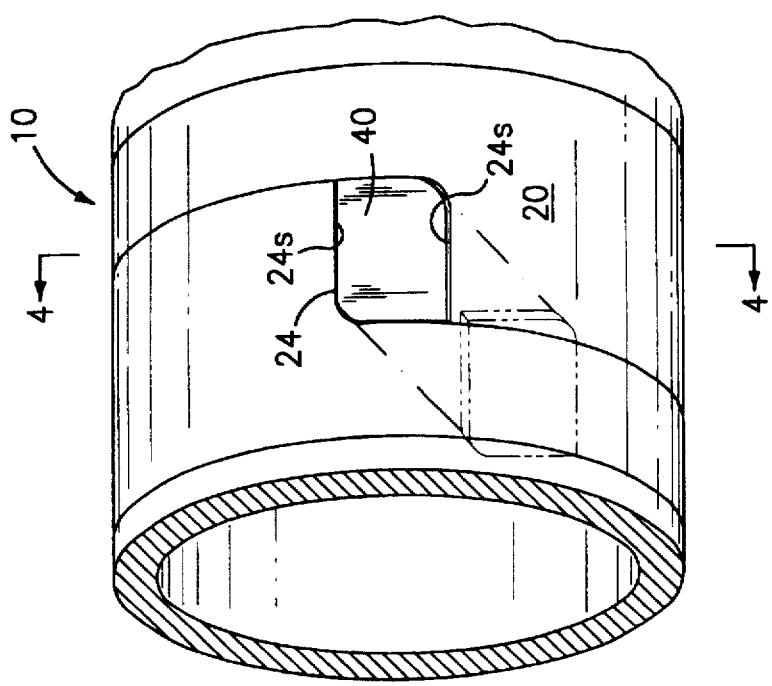
FIG. 3 is an enlarged perspective view of the dynamic balance weight disposed in a longitudinal crossover gap defined by the crossover coil.

In contradistinction to the prior art teachings, the inventor discovered that a balancing scheme is achievable and practical by securing a specially adapted dynamic balance weight 40 in combination with the crossover coil 20. More specifically, and referring to FIGS. 3 and 4, the dynamic balance weight 40 is secured in combination with one of the internally opposed surfaces 24s of the longitudinal crossover gap 24. The means 30 for securing the dynamic balance weight 40 is preferably a high tensile strength soldering agent, though other means may be employed such as adhesive bonding or brazing depending upon the composition of the dynamic balance weight 40. The selected soldering agent 30 will, preferrably, have a melting point above the operating temperature of the overrunning spring clutch assembly and below the tempering or aging temperature of the material chosen for the coil spring 10. Furthermore, the soldering agent 30 must have sufficient tensile strength to react the centrifugal loads acting on the dynamic balance weight 40.

The balance weight 40 is sized and positioned within the crossover gap 24 such that, when the coil spring 10 is driving torque or in an overrunning condition, an exposed surface 40s thereof does not interfere with, i.e., is spaced apart from, the central arbor 32 or one of the clutch members member 34 (shown in phantom in FIG. 4) of a spring clutch assembly. As such, the balance weight 40 is not subject to additional loads, such as those imposed by contact with the arbor 32 or clutch member 34, which may propend to shear the soldering agent 30 or produce wear on the mating surfaces.

In view of the foregoing, it will be appreciated that the dynamic balance weight is volumetrically smaller, particularly in thickness dimension t, to fit within the envelope of the crossover gap 24 and to satisfy the spacing requirements. Accordingly, the dynamic balance weight 40 is composed of a material having a density $\rho_{BW}$ which is greater than the density $\rho_{CC}$ of the base material from which the crossover coil 20 is fabricated. More specifically, to accurately balance the coil spring 10, expression 1.0 is used to calculate the required density $\rho_{BW}$ of the dynamic balance weight 40:

$$\rho_{BW} = \rho_{CC} V_{CC} / V_{BW} \qquad 1.0$$

wherein $V_{CG}$ is the volume of the crossover gap 24; and
wherein $V_{BW}$ is the volume of the dynamic balance weight 40. Insofar as the mass of the soldering agent 30 (i.e., density * volume) is negligible, it may be ignored for the purposes of the above calculation and, consequently, for balancing the coil spring 10. If, however, a more exact solution is desired, expression 1.0a may used to introduce the mass of the soldering agent 30.

$$\rho_{BW} = (\rho_{CC} V_{CC} + \rho_S V_S)/V_{BW} \qquad 1.0a$$

wherein $\rho_S$ is the density of the soldering agent 30; and
wherein $V_S$ is the volume of the soldering agent 30.

While the above expression must be satisfied to achieve dynamic balance, other factors, described in subsequent paragraphs, may be considered which influence the material selected for the dynamic balance weight 40. These include, inter alia, the ease of manufacture of the dynamic balance weight 40, fail-safety considerations should the soldering agent 30 fail, and certain material properties of the dynamic balance weight 40.

Considering the manufacture of the balance weight 40, it may be desirable to form a cross-sectional geometry (see FIG. 4) wherein the exposed inner and outer surfaces 40s of the balance weight 40 are substantially planar. It will be appreciated that machining a planar surface or thickness is less complex than, for example, a radiused surface or thickness. That is, set-up time may be reduced and tolerances may be held more accurately.

When employing this option, the thickness t defined by the exposed surfaces 40s must be less than an opening O which is defined by the geometry of the crossover coil 20 and the crossover gap 24. More specifically, the opening O may be determined by expression 2.0 and 3.0 below:

$$O = R_O \cos\alpha - R_I \qquad 2.0$$

$$\alpha = (\sin^{-1} W/2R_O) \qquad 3.0$$

wherein $R_I$ and $R_O$ are the inner and outer radius dimensions, respectively, of the crossover coil 20;
wherein $\alpha$ is an angle defined by a first radial line $L_1$ extending from the geometric center $20_C$ of the crossover coil 20 to a midpoint $24_{MP}$ of the crossover gap 24, and a second radial line $L_2$ which extends from the geometric center $20_C$ to an outermost edge $24_E$ of the crossover gap 24; and wherein W is the width dimension of the crossover gap 24.

By manipulating and combining expressions 2.0 and 3.0, an expression 4.0 is provided for defining the maximum thickness $t_{MAX}$ of the balance weight 40, as follows:

$$t_{MAX} < R_O \cos(\sin^{-1} W/2R_O) - R_I. \qquad 4.0$$

As yet another option, it may be desirable to sufficiently fill the crossover gap 24 such that, in the event of a solderline, bondline or brazeline failure, the dynamic balance weight 40s is geometrically constrained by the opposed surfaces 24s of the crossover gap 24. Accordingly, in this embodiment of the invention, the dynamic balance weight 40 defines a profile shape (best seen in FIG. 3) which substantially corresponds to the profile geometry of the crossover gap 24. Additionally, or alternatively, the dynamic balance weight defines a minimum thickness dimension $t_{MIN}$ which is given by expression 5.0 below.

$$t_{MIN} > 0.8\ R_O \cos(\sin^{-1} W/2R_O) - R_I. \qquad 5.0$$

In another embodiment of the invention, it may be desirable to employ a dynamic balance weight 40 which, in the event of a solderline, bondline, or brazeline failure, will not score or otherwise damage the base material of the crossover coil 20. In this embodiment, the material composition of the dynamic balance weight has a characteristic hardness which is at least 10 points less on a Rockwell C Hardness scale than the characteristic hardness of the material composition of the crossover coil 20. Such characteristics ensure that the balance weight 40 is sufficiently "soft" such that, if damage is incurred, the balance weight 40 is sacrificed rather than the more costly coil spring 10 or mating components, i.e., arbor 32 or clutch members 34 of the overrunning spring clutch assembly.

Generally, for a coil spring 10 which is suitable for driving high levels of torque, in excess of 5,500 in-lbs (338 N-m), and which minimizes the size of the crossover gap 24, the preferred density $\rho_{BW}$ of the dynamic balance weight 40 may be expressed as follows:

$$1.35\rho_{CC} \geq \rho_{BW} \geq 1.15\rho_{CC} \qquad 6.0$$

Preferably, the entire coil spring 10, including the crossover coil 20, is composed of a hardened steel and the dynamic balance weight 40 is composed of materials selected from the group of phosphor bronze, coin silver, sterling silver, or pure silver. More preferably, the coil spring 10, is composed of a high cobalt steel (i.e., Co>10%) having a material density of about 0.283 $lbs_m/in^3$ (7.83 $g/cm^3$) and the dynamic balance weight 40 is composed of coin silver (Cu>7.5%) having a material density of about 0.372 $lbs_m/in^3$ (10.30 $g/cm^3$). It will be appreciated that the relative material densities will vary depending upon the respective volumes $V_{CG}$, $V_{BW}$ of the crossover gap 24 and the dynamic balance weight 40. More specifically, the volume of the crossover gap 24 will vary depending upon, inter alia, (i) the thickness of the crossover coil 20, i.e., the inner and outer radius dimensions $R_I$, $R_O$ thereof, (ii) the width W of the crossover gap 24 as determined by the diameter of cutting apparatus employed in the manufacture of the coil spring 10, and (iii) the axial length thereof which is determined by the desired width of the crossover coil 20. The volume of the dynamic balance weight will vary depending upon, inter alia (i) the desired spacing or clearance between the exposed surfaces 40s and the arbor 32 and one of the clutch members 34, (ii) the desired cross-sectional shape for ease of manufacturing and/or for retention of the dynamic balance weight 40 in the event of solderline failure and (iii) the minimum thickness required for the soldering agent 30.

The coil spring 10 may be manufactured by a numerically controlled milling machine (not shown) wherein tube stock of a material selected for the coil spring 10 is rotated as an end mill is fed axially along the tube. Initially the tube is oversized in length and wall thickness as compared to the finally formed coil spring. The end mill cutter penetrates a predetermined wall thickness such that a thin wall of material remains, i.e., between adjacent coils, for stabilizing the tube during the milling operation. The feed rate of the end mill may be varied to form coils of varying width, such as may be desired to fabricate the constant stress coils. At a desired crossover point, rotation of the tube is interrupted, such that the end mill produces an axial cut designed to abruptly change coil width. As discussed earlier, such axial cut forms the crossover coil 20. Upon completion of the axial cut, the tube is again rotated until the end mill has traversed or nearly traversed the entire tube.

The exterior of the milled tube is then stabilized using a cast plastic and the interior of the tube is bored such that the thin wall of material is removed and the individual coils are separated. The cast plastic is broken away and the tube is then compressed and heat treated such that the individual coils remain contiguous. As discussed earlier, the axial cut and subsequent compression of tube produces the longitudinal crossover gap 24. Furthermore, it will be appreciated that the width W of the crossover gap 24 is dictated by the diameter of the end mill cutter. The various coils are then clamped and machined to net dimensions.

Based on the various criteria and options discussed above, the configuration of the dynamic balance weight 40 is determined, which configuration dictates the requisite material density of the dynamic balance weight 40 to effect dynamic balance of the coil spring 10. The dynamic balance weight 40 is positioned within the crossover gap 24, and, depending upon the material selected, is soldered, bonded or brazed to one of the opposed surfaces 24s of the crossover gap 24. It will be appreciated that when soldering, certain surfaces should be masked, e.g., the other of the opposed surfaces 24s of the crossover gap 24 and surfaces adjacent thereto, to prevent the solder from wicking into and unintentionally joining other areas of the crossover coil 20.

As formed, the coil spring 10 is produced with an axial or longitudinal crossover gap 24 which serves to maximize the effective bearing support within and between the clutch members of an overrunning spring clutch assembly. As discussed in the Background of the Invention such bearing support augments the bending stiffness of the spring clutch assembly. Furthermore, by accepting and compensating for the imbalance produced by the crossover gap 24, the manufacture of the coil spring 10 is simplified, and, consequently, the cost associated therewith is minimized. Moreover, the crossover coil 20 and balance weight 40 may be fabricated utilizing conventional numerically controlled milling apparatus. Accordingly, the coil spring 10 facilities fabrication without the requirement for specially adapted milling equipment.

Although the invention has been shown and described with respect to exemplary embodiments thereof it should be understood by those skilled in the art that the foregoing and other changes, omissions and additions may be made therein and thereto, without departing from the spirit and scope of the present invention.

What is claimed is:

1. A coil spring (10) for use in an overrunning spring clutch assembly including a central arbor (32) and coaxially aligned clutch members (34), said coil spring (10) having a crossover coil (20) disposed intermediate of its ends, said crossover coil (20) fabricated from a material having a density $\rho_{CC}$ and having a longitudinal crossover gap (24) therein defining internally opposed surfaces (24s), said coil spring (10) being characterized by:

a dynamic balance weight (40) secured in combination with one of said internally opposed surfaces (24s) of the longitudinal crossover gap (24);

said dynamic balance weight (40), furthermore, being fabricated from a material having a density $\rho_{BW}$, said density $\rho_{BW}$ being greater than said density $\rho_{CC}$.

2. The coil spring (10) according to claim 1 wherein said density $\rho_{BW}$ is defined by the expression:

$$1.35\rho_{CC} \geq \rho_{BW} \geq 1.15\rho_{CC}.$$

3. The coil spring (10) according to claim 1 wherein said dynamic balance weight (40) has a characteristic hardness,

9 and wherein said crossover coil (20) has a characteristic hardness, said characteristic hardness of said dynamic balance weight (40) being at least 10 points less on a Rockwell C Hardness scale than said characteristic hardness of said crossover coil (20).

4. The coil spring (10) according to claim 1 wherein said crossover coil (20) is composed of a high cobalt steel and wherein said dynamic balance weight (40) is selected from the group of coin silver, sterling silver, pure silver or phosphor bronze.

5. The coil spring (10) according to claim 1 wherein said crossover coil (10) defines inner and outer radius dimensions, $R_I$ and $R_O$, respectively, and a geometric center $(20_C)$, wherein said longitudinal crossover gap (24) defines a width dimension W and an angle $\alpha$ defined by first and second radial lines $L_1$ and $L_2$, respectively, extending from said geometric center $(20_C)$, said first radial line $L_1$ intersecting a midpoint $(24_{MP})$ of said longitudinal crossover gap (24) and said second line $L_2$ intersecting an outermost edge $(24_E)$ of said longitudinal crossover gap (24), and wherein said dynamic balance weight (40) has inner and outer exposed surfaces (40s), said exposed surfaces (40s) defining a maximum thickness dimension $t_{MAX}$, said maximum thickness dimension $t_{MAX}$ being defined by the expression:

$$t_{MAX} < R_O \cos(\sin^{-1} W/2R_O) - R_I.$$

6. The coil spring (10) according to claim 5 wherein said exposed surfaces (40s) define a minimum thickness dimension $t_{MIN}$, said minimum thickness dimension being is defined by the expression:

$$t_{MIN} > 0.8 R_O \cos(\sin^{-1} W/2R_O) - R_I.$$

7. The coil spring (10) according to claim 6 wherein said longitudinal crossover gap (24) define s a profile geometry, and wherein said dynamic balance weight (40) defines a profile shape substantially corresponding to said profile geometry.

8. The coil spring (10) according to claim 2 wherein said dynamic balance weight (40) has a characteristic hardness, and wherein said crossover coil (20) has a characteristic hardness, said characteristic hardness of said dynamic balance weight (40) being at least 10 points less on a Rockwell C Hardness scale than said characteristic hardness of said crossover coil (20).

9. The coil spring (10) according to claim 2 wherein said crossover coil (20) is composed of a high cobalt steel and wherein said dynamic balance weight (40) is selected from the group of coin silver, sterling silver, pure silver or phosphor bronze.

10. The coil spring (10) according to claim 2 wherein said dynamic balance weight (40) is composed of coin silver.

11. The coil spring (10) according to claim 2 wherein said crossover coil (20) defines inner and outer radius dimensions, $R_I$ and $R_O$, respectively, and a geometric center $(20_C)$, wherein said longitudinal crossover gap (24) defines a width dimension W and an angle $\alpha$ defined by first and second radial lines $L_1$ and $L_2$, respectively, extending from said geometric center $(20_C)$, said first radial line $L_1$ intersecting a midpoint $(24_{MP})$ of said longitudinal crossover gap (24) and said second line $L_2$ intersecting an outermost edge $(24_E)$ of said longitudinal crossover gap (24), and wherein said dynamic balance weight (40) has inner and outer exposed surfaces (40s), said exposed surfaces (40s) defining a maximum thickness dimension $t_{MAX}$, said maximum thickness dimension $t_{MAX}$ being defined by the expression:

$$t_{MAX} < R_O \cos(\sin^{-1} W/2R_O) - R_I.$$

10

12. The coil spring (10) according to claim 11 wherein said exposed surfaces (40s) define a minimum thickness dimension $t_{MIN}$, said minimum thickness dimension being is defined by the expression:

$$t_{MIN} > 0.8 R_O \cos(\sin^{-1} W/2R_O) - R_I.$$

13. The coil spring (10) according to claim 12 wherein said longitudinal crossover gap (24) defines a pro file geometry, and wherein said dynamic balance weight (40) defines a profile shape substantially corresponding to said profile geometry.

14. A coil spring (10) for use in an overrunning spring clutch assembly including a central arbor (32) and coaxially aligned clutch members (34), said coil spring (10) having a crossover coil (20) disposed intermediate of its ends, said crossover coil (20) fabricated from a material having a density $\rho_{CC}$ and having a longitudinal crossover gap (24) therein defining internally opposed surfaces (24s), said coil spring (10) being characterized by:

a dynamic balance weight (40) secured in combination with one of said internally opposed surfaces (24s) of the longitudinal crossover gap (24);

said dynamic balance weight (40), furthermore, being fabricated from a material having a density $\rho_{BW}$, said density $\rho_{BW}$ being defined by the expression:

$$1.35\rho_{CC} \geq \rho_{BW} \geq 1.15\rho_{CC};$$

said dynamic balance weight (40), furthermore having a characteristic hardness, and said crossover coil (20) having a characteristic hardness, said characteristic hardness of said dynamic balance weight (40) being at least 10 points less on a Rockwell C Hardness scale than said characteristic hardness of said crossover coil (20).

15. The coil spring (10) according to claim 14 wherein said crossover coil (20) is composed of a high cobalt steel and wherein said dynamic balance weight (40) is selected from the group of coin silver, sterling silver, pure silver or phosphor bronze.

16. The coil spring (10) according to claim 15 wherein said dynamic balance weight (40) is composed of coin silver.

17. A coil spring (10) for use in an overrunning spring clutch assembly including a central arbor (32) and coaxially aligned clutch members (34), said coil spring (10) having a crossover coil (20) disposed intermediate of its ends, said crossover coil (20) fabricated from a material having a density $\rho_{CC}$ and having a longitudinal crossover gap (24) therein defining internally opposed surfaces (24s), said coil spring (10) being characterized by:

a dynamic balance weight (40) secured in combination with one of said internally opposed surfaces (24s) of the longitudinal crossover gap (24);

said dynamic balance weight (40), furthermore, being fabricated from a material having a density $\rho_{BW}$, said density $\rho_{BW}$ being defined by the expression:

$$1.35\rho_{CC} \geq \rho_{BW} \geq 1.15\rho_{CC};$$

said crossover coil (20) defining inner and outer radius dimensions, $R_I$ and $R_O$, respectively, and a geometric center $(20_C)$;

said longitudinal crossover gap (24) defining a width dimension W and an angle $\alpha$ defined by first and second radial lines $L_1$ and $L_2$, respectively, extending from said geometric center $(20_C)$, said first radial line $L_1$ intersecting a midpoint ($24_{MP}$) of said longitudinal crossover gap (24) and said second line $L_2$ intersecting an outermost edge ($24_E$) of said longitudinal crossover gap (24), said dynamic balance weight (40) has inner and outer exposed surfaces (40s), said exposed surfaces (40s) defining maximum and minimum thickness dimensions $t_{MAX}$ and $t_{MIN}$, respectively, said maximum thickness dimension $t_{MAX}$ being defined by the expression:

$t_{MAX} < R_O \cos(\sin^{-1} W/2R_O) - R_I$; and said minimum thickness dimension being defined by the expression:

$t_{MIN} > 0.8\ R_O \cos(\sin^{-1} W/2R_O) - R_I$.

18. The coil spring (10) according to claim 17 wherein said dynamic balance weight (40) has a characteristic hardness, and wherein said crossover coil (20) has a characteristic hardness, said characteristic hardness of said dynamic balance weight (40) being at least (10) points less on a Rockwell C Hardness scale than said characteristic hardness of said crossover coil (20).

19. The coil spring (10) according to claim 17 wherein said crossover coil (20) is composed of a high cobalt steel and wherein said dynamic balance weight (40) is selected from the group of coin silver, sterling silver, pure silver or phosphor bronze.

20. The coil spring (10) according to claim 19 wherein said dynamic balance weight (40) is composed of coin silver.

* * * * *